(12) United States Patent
Nakano et al.

(10) Patent No.: US 8,641,206 B2
(45) Date of Patent: Feb. 4, 2014

(54) PROJECTOR HAVING A MOVABLE TILTED APERTURE AND CUT FILTER

(75) Inventors: Kiyotaka Nakano, Azumino (JP); Masakazu Kawamura, Matsumoto (JP); Tomoharu Masuda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 290 days.

(21) Appl. No.: 13/164,247

(22) Filed: Jun. 20, 2011

(65) Prior Publication Data

US 2011/0310352 A1  Dec. 22, 2011

(30) Foreign Application Priority Data

Jun. 22, 2010  (JP) ................................. 2010-141393
Nov. 30, 2010  (JP) ................................. 2010-266227

(51) Int. Cl.
| | | |
|---|---|---|
| G03B 21/14 | (2006.01) | |
| G03B 21/20 | (2006.01) | |
| G03B 21/26 | (2006.01) | |
| G02B 9/00 | (2006.01) | |
| G02B 9/08 | (2006.01) | |
| G02B 27/10 | (2006.01) | |
| F21S 8/00 | (2006.01) | |

(52) U.S. Cl.
USPC .................. 353/97; 353/38; 353/84; 353/88; 353/94; 353/102; 362/268; 359/621; 359/738; 359/739

(58) Field of Classification Search
USPC .............. 353/20, 30–31, 38, 88, 94, 97, 102; 362/257, 268, 317; 359/483.01, 359/485.01, 619, 621, 738–739; 348/744
See application file for complete search history.

(56) References Cited

U.S. PATENT DOCUMENTS

| | | | | |
|---|---|---|---|---|
| 6,611,381 | B2 * | 8/2003 | Kodama et al. ............... | 359/619 |
| 6,644,812 | B2 * | 11/2003 | Kodama et al. ................. | 353/31 |
| 8,308,305 | B2 * | 11/2012 | Nakano et al. ................. | 353/84 |
| 2004/0246448 | A1 * | 12/2004 | Ogawa et al. ................... | 353/84 |
| 2005/0219474 | A1 * | 10/2005 | Hara et al. ...................... | 353/88 |
| 2007/0047052 | A1 | 3/2007 | Nakano et al. | |
| 2011/0310358 | A1 * | 12/2011 | Wakabayashi et al. ......... | 353/38 |

FOREIGN PATENT DOCUMENTS

JP  2007-65496 A  3/2007

* cited by examiner

Primary Examiner — Tony Ko
Assistant Examiner — Jori S Reilly-Diakun
(74) Attorney, Agent, or Firm — ALG Intellectual Property, LLC

(57) ABSTRACT

A projector includes a light source device which emits an illumination light; an aperture disposed with a tilt with respect to a plane perpendicular to a center axis of the illumination light, provided with an opening section which transmits a part of the illumination light, and block a rest of the illumination light; a pair of first and second lens arrays which divides the illumination light from the light source device into a plurality of partial light; and an overlapping lens which overlaps the illumination light transmitted through the first and second lens arrays, wherein the aperture is disposed on a light path between the light source device and the overlapping lens.

10 Claims, 10 Drawing Sheets

PROJECTOR HAVING A MOVABLE TILTED APERTURE AND CUT FILTER

BACKGROUND

1. Technical Field

The present invention relates to a projector provided with an illumination having optical components such as a filter disposed so as to be able to move into and out of a light path.

2. Related Art

As a projector of a related art, there exists a device having an optical filter disposed on the light path of the illumination device in a tilted state with respect to the plane perpendicular to the light axis (see JP-A-2007-65496). The optical filter is supported by a rail together with the support member, and moves into and out of the light path between the second lens array and the polarization conversion element while keeping the tilted state by driving the support member provided with a rack with a drive mechanism including gears and an electric motor.

Incidentally, in such a projector as described above, there are some cases in which it is desired to dispose not only the optical filter but also another optical component such as an aperture so as to be able to move into and out of the light path in order for realizing a variety of reflection modes. However, in the case of adding another optical component, since the space for disposing the optical components and the drive mechanism therefor is almost doubled compared to the case with the optical filter alone, as a result of the light path extension due to the preparation of such a space, there arises a tendency of increasing the light intensity loss in the illumination device.

SUMMARY

An advantage of some aspects of the invention is to provide a projector incorporating two or more optical components capable of moving into and out of the light path while reducing the light intensity loss in the illumination device.

A projector according to an aspect of the invention includes a light source device which emits an illumination light, an aperture disposed with a tilt with respect to a plane perpendicular to a center axis of the illumination light, provided with an opening section which transmits a part of the illumination light, and block a rest of the illumination light, a pair of first and second lens arrays which divides the illumination light from the light source device into a plurality of partial lights, and an overlapping lens which overlaps the illumination light transmitted through the first and second lens arrays, wherein the aperture is disposed on a light path between the light source device and the overlapping lens.

According to the projector of this aspect of the invention, since the aperture blocks at least a part of the illumination light to thereby transmit by priority the illumination light relatively contributing to the improvement of the substantial contrast characteristics in this case, it is possible to make it operate in the contrast priority mode for performing image projection giving priority to the contrast. Further, since the aperture is disposed with a tilt with respect to the plane perpendicular to the center axis of the illumination light, the negative effect such as generation of a ghost image can be prevented in the image projection in the contrast priority mode. Further, by disposing the aperture between the posterior stage and the overlapping lens, appropriate selection between the light having contribution to the substantial improvement of the contrast characteristics and the light having no contribution thereto out of the illumination light becomes possible.

According to a specific aspect of the invention, the projector of the aspect of the invention may be configured to further include a cut filter which attenuates a light in a predetermined wavelength range, and a polarization conversion section disposed between the second lens array and the overlapping lens and which arranges a polarization state, wherein two optical components, the cut filter and the aperture, are disposed between the second lens array and the polarization conversion section, and the cut filter is disposed on the second lens array side, and the aperture is disposed on the polarization conversion section side. In this case, since the aperture can be disposed at a position distant from the light source device, and the light reduction with the filter can be performed, it is possible to prevent the temperature rise in the aperture, and the deterioration and the damage of the members for supporting the aperture and the members located in the vicinity of the aperture due to the heat.

In another aspect of the invention, the projector of the aspect may be configured to further include a support shaft common to the two optical components and support the two optical components slidably in a predetermined direction intersecting an optical axis, and the two optical components are arranged to be able to be disposed on the light path so as to overlap each other by a slide movement. In this case, since the two optical components can individually be disposed on the light path in the illumination device provided with the light source device, the first and second lens arrays, the polarization conversion section, and the overlapping lens, the projection state of the image by the projector can be adjusted with a plurality of patterns. Further, according to the projector described above, since the two optical components can be disposed on the light path in an overlapping manner by the sliding movement using the common support shaft, the moving mechanism of the two optical components can be downsized with the common support shaft, and therefore, it is possible to move the two optical components into and out of the light path with a reduced space. Thus, the light intensity loss in the illumination device can be reduced even in the case in which the two or more optical components are arranged to be able to move into and out of the light path to thereby make a variety of switching of the projection state possible.

In another aspect of the invention, the projector of the aspect of the invention may be configured such that the light source device, the first and second lens arrays, the polarization conversion section, and the overlapping lens constitute an illumination device, and the illumination device has a guide section which supports the two optical components from respective sides of the support shaft opposite to each other. In this case, each of the optical components is supported so as to be held between the support shaft and the guide section to thereby be simply and surely guided, and it is possible to stabilize the sliding movement of each of the optical components with a reduced space.

In another aspect of the invention, the projector of the aspect of the invention may be configured such that the two optical components are disposed with a tilt with respect to a reference plane perpendicular to an optical axis. In this case, in the image projection in the operation mode of inserting the two optical components on the light path, the negative effect such as generation of the ghost image can be prevented.

In another aspect of the invention, the projector of the aspect of the invention may be configured such that the two optical components move in a direction with a tilt with respect to the reference plane to thereby move into and out of the light path. Further, the two optical components move into and out of the light path while keeping a state having a tilt with respect to the reference plane. In this case, even if the two optical components are inserted on the light path with a tilt, it is possible to make the back and forth movement of the two optical components while preventing the optical path length of the space to which the two optical components are inserted from increasing.

In another aspect of the invention, the aperture can be disposed on the light path under the condition that the cut filter is disposed on the light path. In this case, since the light reduction with the filter can be performed on the light emitted from the light source device, it is possible to prevent the temperature rise in the aperture, and the deterioration and the damage of the members for supporting the aperture and the members located in the vicinity of the aperture due to the heat.

Further, if the two optical components are disposed to be able to move into and out of the light path, which is located between the second lens array and the polarization conversion section, and is apt to be relatively narrow, it is not required to substantially increase the distance between the second lens array and the polarization conversion section, and further, the deterioration of the illumination light due to the process performed on the illumination light by the optical components can reliably be prevented.

In another aspect of the invention, the project of the aspect of the invention may be configured such that the two optical components each have a support member which supports a component main body, the support member has a rack disposed so as to face the support shaft in a condition of being supported by the support shaft, and the rack is driven by an electric motor via a gear. In this case, the support member supported by the support shaft, namely the optical component, can automatically be moved back and forth using the electric motor or the like.

BRIEF DESCRIPTION OF THE DRAWINGS

The invention will be described with reference to the accompanying drawings, wherein like numbers reference like elements.

FIG. 2B is a side view of the mode switching device and so on, and FIG. 2C is a front view of the mode switching device and so on.

FIG. 8 is a plan view for explaining the structure of a guide mechanism and so on.

DESCRIPTION OF EXEMPLARY EMBODIMENTS

Hereinafter, a projector according to one embodiment of the invention will be explained in detail with reference to the accompanying drawings.

Optical System of Projector

Figure 1:
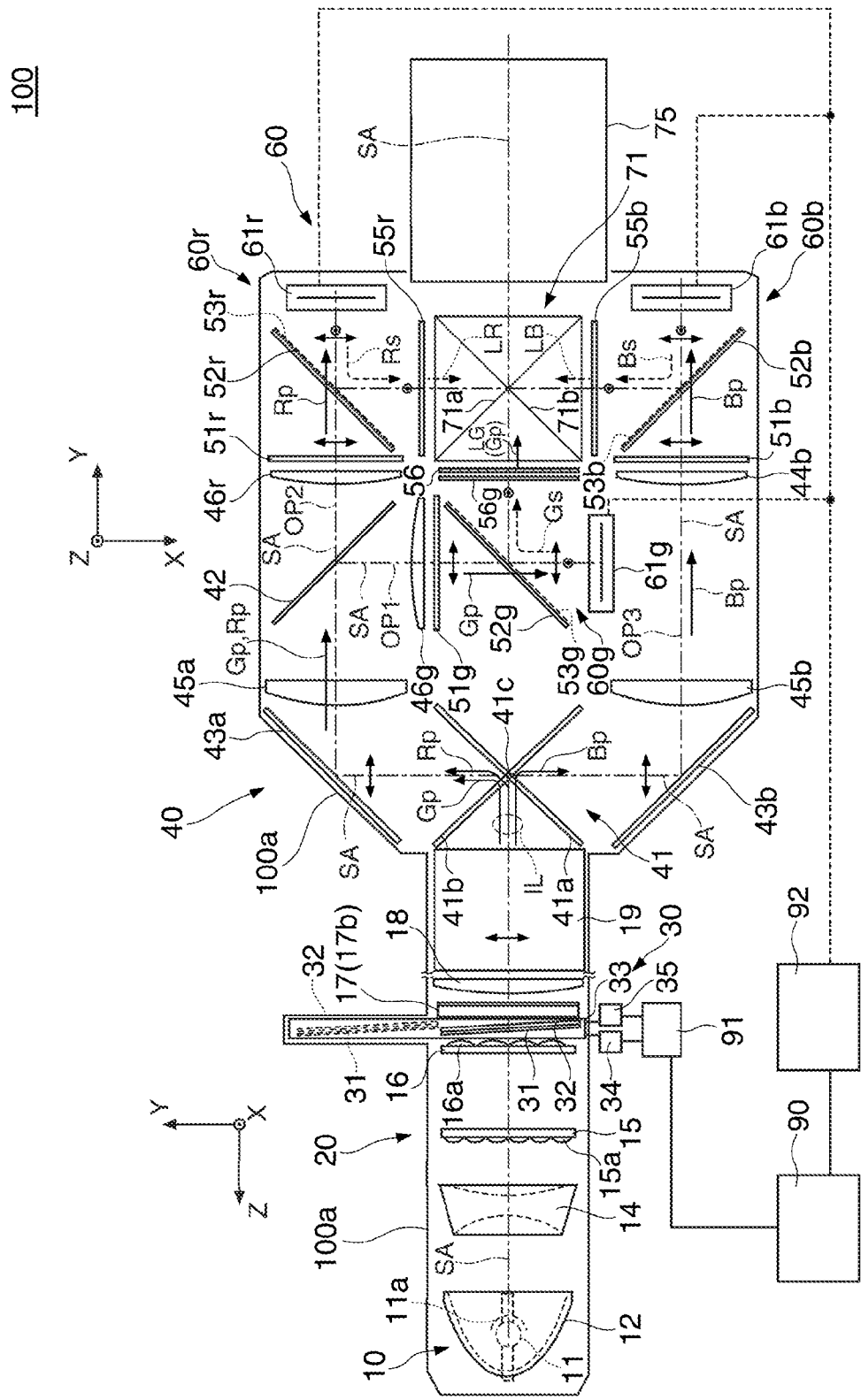
FIG. 1 is a diagram conceptually showing the optical system of a projector according to the embodiment of the invention.

As shown in FIG. 1, as the optical system, the projector 100 is provided with an illumination device 20 for emitting the illumination light, a color separation light guide section 40 for separating the illumination light from the illumination device 20 into three colored lights of green, red, and blue, a light modulation section 60 for respectively modulating the three colored lights emitted from the color separation light guide section 40, a light combining section 71 for combining the image lights of the respective colors emitted from the light modulation section 60, and a projection optical system 75 for projecting the image light thus combined by the light combining section 71. Among these constituents, the portion from the illumination device 20 to the light combining section 71 is housed inside a light guide 100a. It should be noted that although the drawing shows the condition of being partially developed for the sake of convenience, the system optical axis SA inside the illumination device 20 extends along the Z direction perpendicular to the X-Y plane in which the system optical axis SA in a portion from the color separation light guide section 40 to the projection optical system 75 is disposed.

In the projector 100 described above, the illumination device 20 is provided with a light source device 10, a concave lens 14, first and second lens arrays 15, 16, a polarization conversion section 17, an overlapping lens 18, and a mode switching device 30. Among these constituents, the light source device 10 is a light source for emitting a light for illumination, and is provided with, for example, a light emitting tube 11 such as a high-pressure mercury lamp, a secondary mirror 11a for retuning the light emitted from the light emitting tube 11 toward the front where the overlapping lens 18 and so on are located, and a concave mirror 12 for reflecting the light emitted backward from the light emitting tube 11. The concave lens 14, which has a role of collimating the light from the light source device 10, can also be eliminated in the case in which, for example, the concave mirror 12 is a parabolic mirror. The first lens array 15 is composed of a plurality of element lenses 15a disposed in a matrix with respect to both of the X direction and the Y direction, and divides the light emitted from the concave lens 14 so as to correspond to the compartments of the element lenses 15a. The second lens array 16 is composed of a plurality of element lenses 16a disposed so as to correspond respectively to the element lenses 15a, and adjusts the divergent states of the divisional lights from the respective element lenses 15a. The polarization conversion section 17 converts the divisional lights emitted from the second lens array 16 into only the linearly polarized light having a polarization plane parallel to a first direction (e.g., the X direction in this case). The overlapping lens 18 appropriately collects the illumination light IL of the linearly polarized light passing through the polarization conversion section 17 as a whole, thereby making it possible to illuminate the illuminated area, namely the liquid crystal light valves 60g, 60r, and 60b of the respective colors provided to the light modulation section 60 in an overlapping manner. Specifically, the illumination light IL passing through the both lens arrays 15, 16 and the overlapping lens 18 illuminates the illumination areas of the liquid crystal panels 61g, 61r, and 61b of the respective colors provided to the light modulation section 60 with roughly even illuminance after passing through the color separation light guide section 40 described in detail below.

Figure 2A:
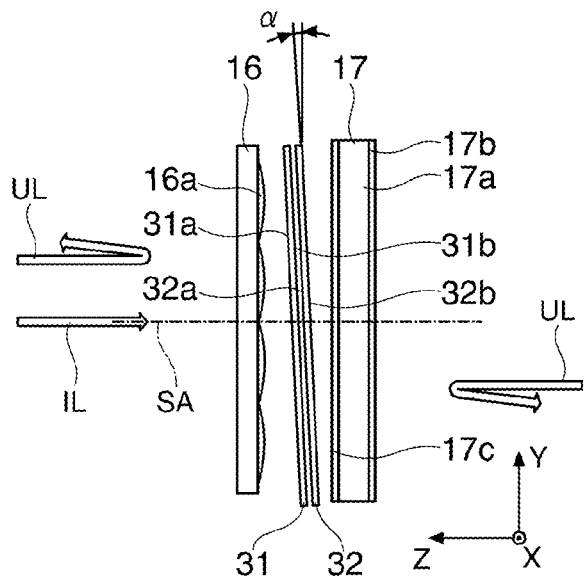
FIG. 2A is an enlarged plan view of a mode switching device and the periphery thereof.
Figure 2B:
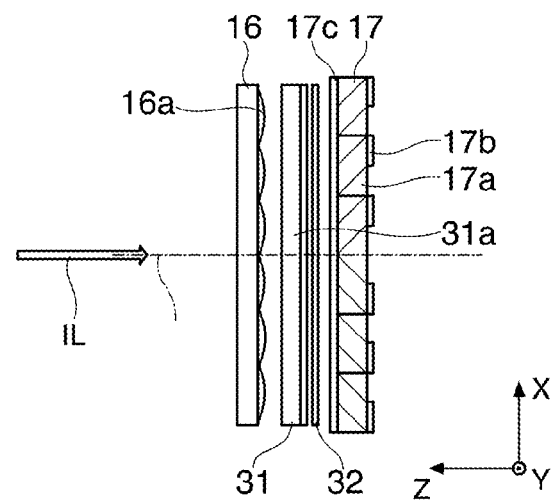

As shown in FIG. 2B, the polarization conversion section 17 is provided with a plurality of prism elements 17a each having a structure incorporating PBS and a mirror, and a plurality of phase difference plates 17b bonded on one light emitting surfaces of the respective prism elements 17a. Each of the prism elements 17a is a rod-like member extending in the Y direction, and the plurality of prism elements 17a is arranged in the X direction and thus disposed to have a plate-like shape extending in parallel to the X-Y plane as a whole. As described above, the illumination light IL (Gp, Rp, and Bp) of the linearly polarized light having the polarization plane parallel to the X direction is output from the polarization conversion section 17 (see FIG. 1). It should be noted that a striped mask 17c is formed on the light entrance side of the polarization conversion section 17 to thereby prevent the polarization degree from being degraded.

Returning to FIG. 1, the mode switching device 30 in the illumination device 20 is provided with a cut filter 31 as a first optical component, an aperture 32 as a second optical component, a slide mechanism 33 as a movement mechanism for individually moving the cut filter 31 and the aperture 32 into and out of the light path between the second lens array 16 and the polarization conversion section 17, and a pair of electric motors 34, 35 as drive sources of the slide mechanism 33.

The cut filter 31 is a plate-like color gamut filter for adjusting the color gamut of the illumination light IL, and adjusts the tint of the projection image by attenuating the spectrum component of a predetermined wavelength range out of the illumination light IL emitted from the light source device 10 by reflection or absorption in the ON state in which the cut filter 31 is disposed on the light path. For example, in the case in which the cut filter 31 is a color gamut filter for attenuating the intensity of the green light component and the red light component in the vicinity of 580 nm as the predetermined wavelength range, the separation between the green light component and the red light component is improved, and thus the color reproducibility of red and green can be enhanced.

The cut filter 31 is arranged to be able to move into and out of the light path of the illumination light IL taking the system optical axis SA as the center axis by making a slide movement in the ±Y directions exactly perpendicular to the system optical axis SA, and attenuates the light in the predetermined wavelength range out of the illumination light IL in the ON state (the solid lines in the drawing) in which the cut filter 31 is disposed on the light path, but does not attenuate the illumination light IL in the OFF state (the dotted lines in the drawing) in which the cut filter 31 is retracted out of the light path. Due to the presence of such a cut filter 31, in the projector 100 according to the present embodiment, it is possible to perform the image projection in a display mode (hereinafter referred to as a color reproducibility priority mode) with high color reproducibility for selectively transmitting the light in the wavelength range making a contribution to the enhancement of the color reproducibility out of the illumination light IL when disposing the cut filter 31 on the light path. On the other hand, the present projector 100 can also perform the image projection in a high-intensity display mode (hereinafter referred to as a brightness priority mode) for directly transmitting the illumination light IL by retracting the cut filter 31 to the position departing from the light path.

Figure 2C:
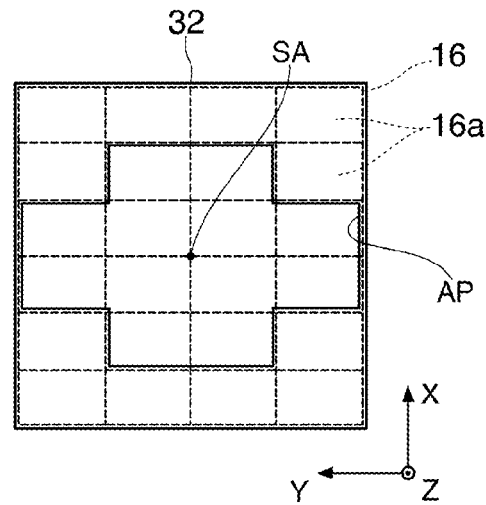

The aperture 32 is a plate-like light blocking member for adjusting the cross-sectional shape of the illumination light IL, and partially blocks the illumination light IL emitted from the light source device 10 in the ON state in which the aperture 32 is disposed on the light path, thereby adjusting the incident angle range of the illumination light IL for illuminating the liquid crystal panels 61g, 61r, and 61b constituting the light modulation section 60, namely the aperture angle. As shown in FIG. 2C, the aperture 32 transmits a central portion of the illumination light IL with an opening AP provided thereto, and blocks the rest of the illumination light IL with the periphery of the opening AP. Here, in order for preventing the luminance variation from occurring, the contour of the opening AP corresponds to the contour of the combination of the 12 element lenses 16a close to the system optical axis SA out of the plurality of element lenses 16a constituting the second lens array 16. As described above, in the case in which the peripheral light of the illumination light IL is blocked by the aperture 32 to thereby narrow down the illumination light to the central light with a small incident angle, the leakage light in each of the liquid crystal panels 61g, 61r, and 61b is reduced, and the contrast in the display by the light modulation section 60 can be raised.

Returning to FIG. 1, the aperture 32 is arranged to be able to move into and out of the light path of the illumination light IL taking the system optical axis SA as the center axis by making a slide movement in the ±Y directions exactly perpendicular to the system optical axis SA, and blocks the peripheral light out of the illumination light IL in the ON state (the solid lines in the drawing) in which the aperture 32 is disposed on the light path, but does not block the illumination light IL in the OFF state (the dotted lines in the drawing) in which the aperture 32 is retracted out of the light path. Due to the presence of such an aperture 32, in the projector 100 according to the present embodiment, it is possible to perform the image projection in a mode (hereinafter referred to as a contrast priority mode) of high-contrast display for transmitting only the central light relatively contributing to the improvement of the contrast characteristic out of the illumination light IL when disposing the aperture 32 on the light path. On the other hand, the present projector 100 can also perform the image projection in the brightness priority mode for directly transmitting the illumination light IL by retracting the aperture 32 to the position departing from the light path.

The slide mechanism 33 for supporting the cut filter 31 and the aperture 32 is driven by the first electric motor 34 to make the cut filter 31 move into and out of the light path, and at the same time, driven by the second electric motor 35 to make the aperture 32 move into and out of the light path. The rotational operations of these electric motors 34, 35 are controlled by the motor drive section 91 including a position sensor or the like not shown under the supervision of the control device 90.

As shown in FIG. 2A and so on, the entrance side surface 31a as a principal surface of the cut filter 31 constituting the mode switching device 30 is not exactly parallel to the plane perpendicular to the system optical axis SA, namely the X-Y plane, and is moved into and out of the light path while being held in the state in which the entrance side surface 31a is slightly tilted so that the +Y end thereof is located on the downstream side in the light path from the −Y end. Specifically, the cut filter 31 is in the state of rotating counterclockwise as much as the tilt angle α around the axis parallel to the X direction taking the X-Y plane as a reference. Thus, the unwanted light UL such as the return light proceeding from the downstream side of the light path toward the cut filter 31 is reflected by the exit side surface 31b as the reverse side of the cut filter 31 toward the outside of the light path of the illumination light IL. As a result, the unwanted light UL is prevented from becoming a part of the illumination light IL to be guided to the light modulation section 60 on the posterior stage of the illumination device 20, and is therefore eliminated without becoming a source of the ghost image. In other words, the projector 100 can provide a preferable image without generating the ghost image also in the color reproducibility priority mode. Further, since the cut filter 31 is tilted as described above, the component reflected on the entrance side surface 31a of the cut filter 31 out of the illumination light IL proceeding from the upstream side of the light path toward the cut filter 31 is also, for example, discharged to the outside of the light path without directly returning to the light source device 10 located on the opposite side, and can therefore be prevented from becoming the cause of, for example, heating of the light emitting tube 11.

Similarly, the aperture 32 also rotates counterclockwise as much as the tilt angle α around the axis parallel to the X direction taking the X-Y plane as a reference, and the obverse surface 32a as a principal surface of the aperture 32 moves into and out of the light path while being held in the state of tilting so that the +Y end thereof is located on the downstream side of the light path from the −Y end. Thus, the unwanted light UL such as the return light proceeding from the downstream side of the light path toward the aperture 32 is reflected by the reverse side surface 32b of the outer edge portion of the aperture 32 in the direction toward the outside of the light path of the illumination light IL, and is eliminated without becoming the source of the ghost image. In other words, the projector 100 can provide a preferable image without generating the ghost image also in the contrast priority mode. Further, since the aperture 32 is tilted as described above, the component reflected on the obverse side surface 32a of the outer edge portion of the aperture 32 out of the illumination light IL proceeding from the upstream side of the light path toward the aperture 32 is also, for example, discharged to the outside of the light path without directly returning to the light source device 10 located on the opposite side, and can therefore be prevented from becoming the cause of, for example, heating of the light emitting tube 11.

Here, the tilt direction or the tilt orientation of the cut filter 31 and the aperture 32 is parallel to the Y direction, and coincides with the direction of the back and forth movement of the cut filter 31 and the aperture 32. In other words, the cut filter 31 and the aperture 32 move in a tilted direction. Further, the cut filter 31 is disposed on the side of the second lens array 16, and as a result, the aperture 32 is disposed on the relatively back side (the retraction side) from the cut filter 31 with respect to the back and forth movement thereof. Moreover, the cut filter 31 and the aperture 32 are disposed in a state of being extremely close to each other for the sake of space saving. As a result, the back and forth movement of the cut filter 31 has precedence of the back and forth movement of the aperture 32 in terms of function. That is, although it is possible to switch between ON and OFF of the contrast priority mode by moving the aperture 32 into and out of the light path in the color reproducibility priority mode of disposing the cut filter 31 on the light path, it is not achievable to dispose the aperture 32 on the light path in the brightness priority mode of retracting the cut filter 31 from the light path, and therefore, it is not achievable to switch ON the contrast priority mode. Specifically, although it is achievable to dispose the cut filter 31 and the aperture 32 on the light path and to retract them from the light path together with each other, it is not achievable to dispose the aperture 32 on the light path if the cut filter 31 is retracted from the light path. It should be noted that it is achievable to move the cut filter 31 into and out of the light path even if the aperture 32 is retracted from the light path. By disposing the aperture 32 on the back side of the cut filter 31 as described above, the aperture 32 is disposed at a position distant from the light source device, and it is possible to prevent the aperture 32 from becoming high temperature due to the light reduction by the cut filter 31, and to prevent the holding member and the members closely located thereto from becoming high temperature, thus it becomes possible to prevent the deterioration and damage of the members due to the heat. Further, by giving precedence of the aperture 32 to the cat filter 31, it is possible to enhance the color reproducibility in the scene in which the depth of black is provided by enhancing the contrast of the projection image using the aperture 32.

Returning to FIG. 1, the color separation light guide section 40 is provided with a cross dichroic mirror 41, a dichroic mirror 42, deflection mirrors 43a, 43b, first lenses 45a, 45b, and second lenses 46g, 44b, and 46r. Here, the cross dichroic mirror 41 is provided with a first dichroic mirror 41a and a second dichroic mirror 41b. The first and second dichroic mirrors 41a, 41b cross orthogonally to each other, and the intersection axis 41c thereof extends in the Z direction. The first dichroic mirror 41a reflects, for example, green (G) light and red (R) light included in the illumination light IL input from the illumination device 20 via a light path folding mirror 19, and transmits the remaining blue (B) light. The second dichroic mirror 41b reflects the blue (B) light and transmits the green (G) light and the red (R) light. The dichroic mirror 42 reflects, for example, the green (G) light out of the light including the green/red (GR) light input thereto, and transmits the remaining red (R) light. Thus, the green light Gp, the red light Rp, and the blue light Bp included in the illumination light IL emitted from the illumination device 20 are led respectively to first, second, and third optical paths OP1, OP2, and OP3, and respectively enter different illumination objects. In the detailed explanation, the illumination light IL from the illumination device 20 enters the cross dichroic mirror 41. The green light Gp, which is reflected/branched by the first dichroic mirror 41a of the cross dichroic mirror 41, and is then further reflected/branched by the dichroic mirror 42 via the deflection mirror 43a and so on, enters a polarization splitter 52g of the liquid crystal light valve 60g. Further, the red light Rp, which is reflected/branched by the first dichroic mirror 41a of the cross dichroic mirror 41, and then branched by the transmission through the dichroic mirror 42, enters the polarization splitter 52r of the liquid crystal light valve 60r. The blue light Bp, which is reflected/branched by the second dichroic mirror 41b of the cross dichroic mirror 41, enters the polarization splitter 52b of the liquid crystal light valve 60b via the deflection mirror 43b and so on.

The light modulation section 60 is provided with the three liquid crystal light valves 60g, 60r, and 60b corresponding to the three optical paths OP1, OP2, and OP3 for the respective colors described above. Each of the liquid crystal light valves 60g, 60r, and 60b is a passive light modulation device for modulating the spatial distribution of the intensity of the incident illumination light.

Here, the liquid crystal light valve 60g for the G color disposed on the first optical path OP1 is provided with the liquid crystal panel 61g illuminated by the green light Gp, the polarization splitter 52g for managing the input/output of the green light in the liquid crystal light valve 60g, an entrance polarization plate 51g disposed on the light entrance side of the liquid crystal light valve 60g, and an exit polarization plate 55g disposed on the light exit side of the liquid crystal light valve 60g. Among these constituents, the liquid crystal panel 61g is a reflective liquid crystal element provided with a reflecting plate disposed on the back side and emitting the modulated light from the surface to which the illumination light is input, and is illuminated with even illuminance by the green light Gp, which is reflected by the first dichroic mirror 41a and the dichroic mirror 42, and is then transmitted through the polarization splitter 52g. Although the explanation with illustration is omitted, the liquid crystal panel 61g is provided with a light transmissive substrate having a transparent electrode and so on, a drive substrate having reflective pixel electrodes and so on, and a liquid crystal layer hermetically encapsulated between the light transmissive substrate and the drive substrate. The liquid crystal panel 61g converts the polarization state of the green light Gp input thereto in accordance with the image signal, and then reflects it toward the polarization splitter 52g. An exit side pattern layer 53g of the polarization splitter 52g selectively reflects only the linearly polarized component in a second direction (the Z direction in this case) perpendicular to a first direction out of the light modulated through the liquid crystal panel 61g.

The liquid crystal light valve 60r for the R color disposed on the second optical path OP2 is provided with the liquid crystal panel 61r illuminated by the red light Rp, the polarization splitter 52r for managing the input/output of the red light in the liquid crystal light valve 60r, an entrance polarization plate 51r disposed on the light entrance side of the liquid crystal light valve 60r, and an exit polarization plate 55r disposed on the light exit side of the liquid crystal light valve 60r. Among these constituents, the liquid crystal panel 61r is a reflective liquid crystal element provided with a reflecting plate disposed on the back side and emitting the modulated light from the surface to which the illumination light is input, and is illuminated with even illuminance by the red light Rp, which is reflected by the first dichroic mirror 41a, transmitted through the dichroic mirror 42, and then transmitted through the polarization splitter 52r. Although the detailed explanation is omitted, the liquid crystal panel 61r has substantially the same structure as that of the liquid crystal panel 61g for the green color. The liquid crystal panel 61r converts the polarization state of the red light Rp input thereto in accordance with the image signal, and then reflects it toward the polarization splitter 52r. An exit side pattern layer 53r of the polarization splitter 52r selectively reflects only the linearly polarized component in the second direction (the Z direction in this case) perpendicular to the first direction out of the light modulated through the liquid crystal panel 61r.

The liquid crystal light valve 60b for the B color disposed on the third optical path OP3 is provided with the liquid crystal panel 61b illuminated by the blue light Bp, the polarization splitter 52b for managing the input/output of the blue light in the liquid crystal light valve 60b, an entrance polarization plate 51b disposed on the light entrance side of the liquid crystal light valve 60b, and an exit polarization plate 55b disposed on the light exit side of the liquid crystal light valve 60b. Among these constituents, the liquid crystal panel 61b is a reflective liquid crystal element provided with a reflecting plate disposed on the back side and emitting the modulated light from the surface to which the illumination light is input, and is illuminated with even illuminance by the blue light Bp, which is reflected by the second dichroic mirror 41b, and is then transmitted through the polarization splitter 52b. Although the detailed explanation is omitted, the liquid crystal panel 61b has substantially the same structure as that of the liquid crystal panel 61g for the green color. The liquid crystal panel 61b converts the polarization state of the blue light Bp input thereto in accordance with the image signal, and then reflects it toward the polarization splitter 52b. An exit side pattern layer 53b of the polarization splitter 52b selectively reflects only the linearly polarized component in the second direction (the Z direction in this case) perpendicular to the first direction out of the light modulated through the liquid crystal panel 61b.

The liquid crystal panels 61g, 61r, and 61b described above are controlled in the optical characteristics by the panel drive section 92 under the supervision of the control device 90, and modulate the polarization states of the lights to be reflected by the respective liquid crystal panels 61g, 61r, and 61b.

The light combining section 71 has a substantially rectangular planar shape composed of four rectangular prisms bonded to each other, and on the interfaces on which the rectangular prisms are bonded to each other, there is formed a pair of dichroic mirrors 71a, 71b intersecting with each other to form an X-shape as the combining surfaces. The both dichroic mirrors 71a, 71b are composed of dielectric multilayer films having characteristics different from each other. Specifically, one of the dichroic mirrors, the first dichroic mirror 71a, reflects the red light LR while the other of the dichroic mirrors, the second dichroic mirror 71b, reflects the blue light LB. The light combining section 71 transmits the green light LG, which has been modulated and input from the liquid crystal light valve 60g, through the first and second dichroic mirrors 71a, 71b to thereby make the green light LG proceed straight in the Y direction, reflects the red light LR, which has been modulated and input from the liquid crystal light valve 60r, with the first dichroic mirror 71a to fold the light path to thereby emit the red light LR in the Y direction, and reflects the blue light LB, which has been modulated and input from the liquid crystal light valve 60b, with the second dichroic mirror 71b to fold the light path to thereby emit the blue light LB in the Y direction. On the light exit side of the light combining section 71, the colored lights LG, LB, and LR are overlapped each other to thereby perform the color composition. It should be noted that between the light combining section 71 and the liquid crystal panel 61g for the G color, there is disposed a ½ wave plate 56 in order for inputting the green light LG to the dichroic mirrors 71a, 71b in the P-polarized state.

The projection optical system 75 projects the color image light combined by the light combining section 71 on the screen (not shown) with a desired magnification. Therefore, a color movie or a color still image corresponding to the drive signals or the image signals input to the respective liquid crystal panels 61g, 61r, and 61b is projected on the screen with a desired magnification.

Mechanical Structure of Projector

Figure 3A:
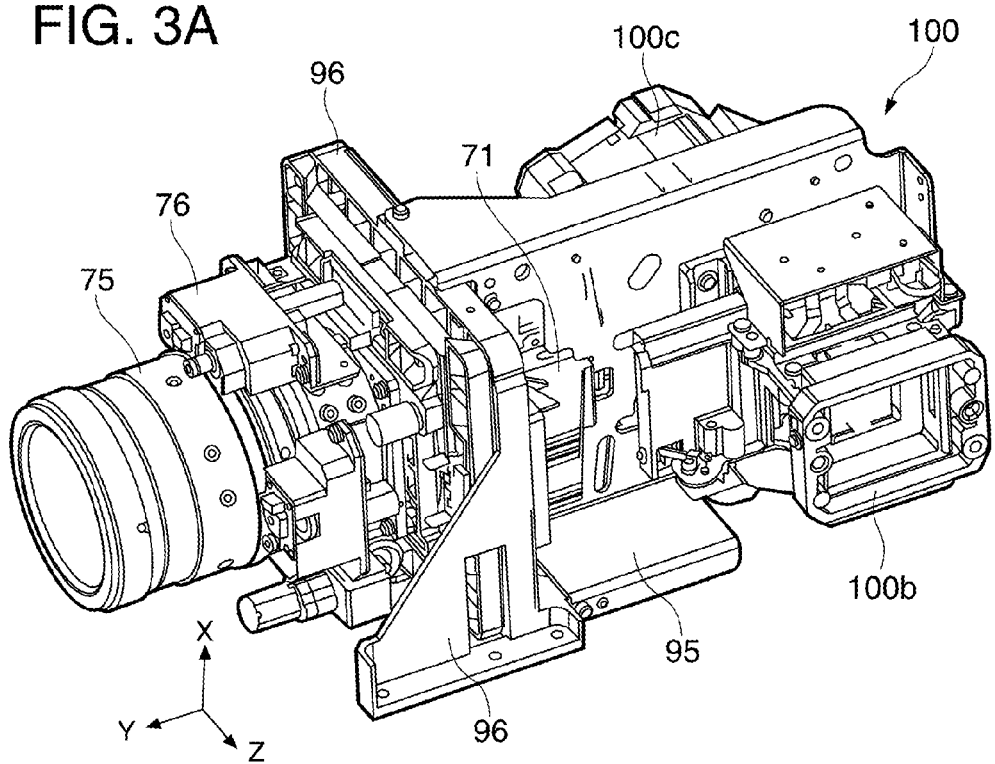
FIG. 3A is a perspective view for explaining an internal mechanical structure of the projector.
Figure 3B:
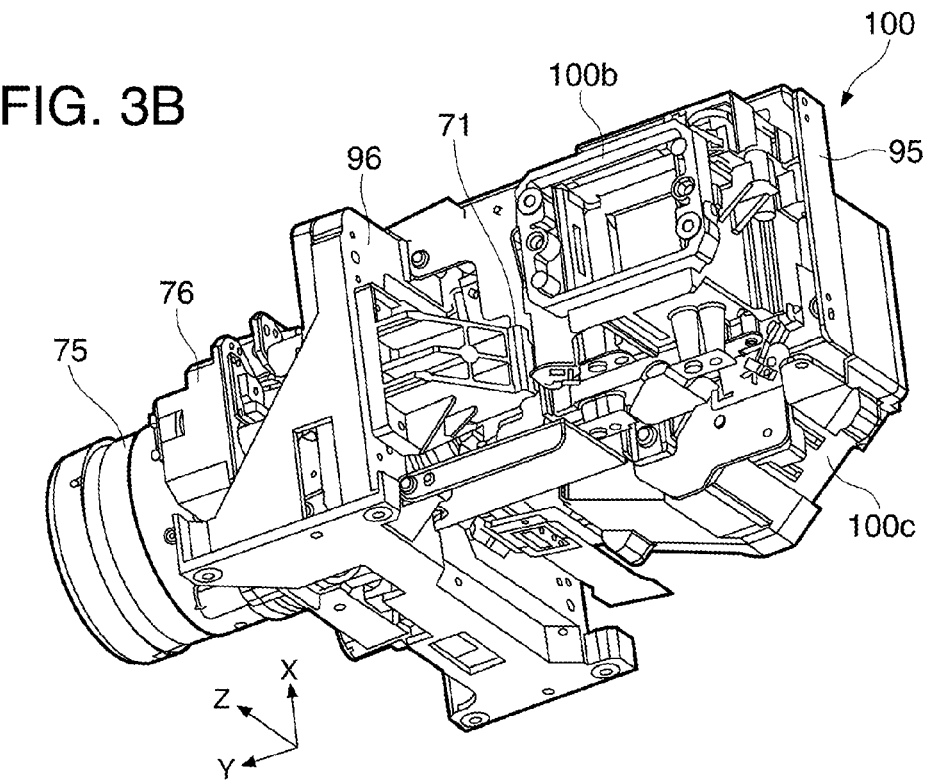
FIG. 3B is also a perspective view for explaining the internal mechanical structure of the projector.

FIGS. 3A and 3B are perspective views for explaining the internal mechanical structure of the projector 100. In the projector 100 shown in the drawings, a first base section 95 is apart for supporting and fixing the illumination device 20 and the color separation light guide section 40, and a second base section 96 is a part for supporting and fixing the projection optical system 75 and the light combining section 71. A first light guide part 100b and a second light guide part 100c constituting a light guide 100a are fixed to the first base section 95, and the projection optical system 75 is supported by the second base section 96 via a lens drive device 76.

Figure 4:
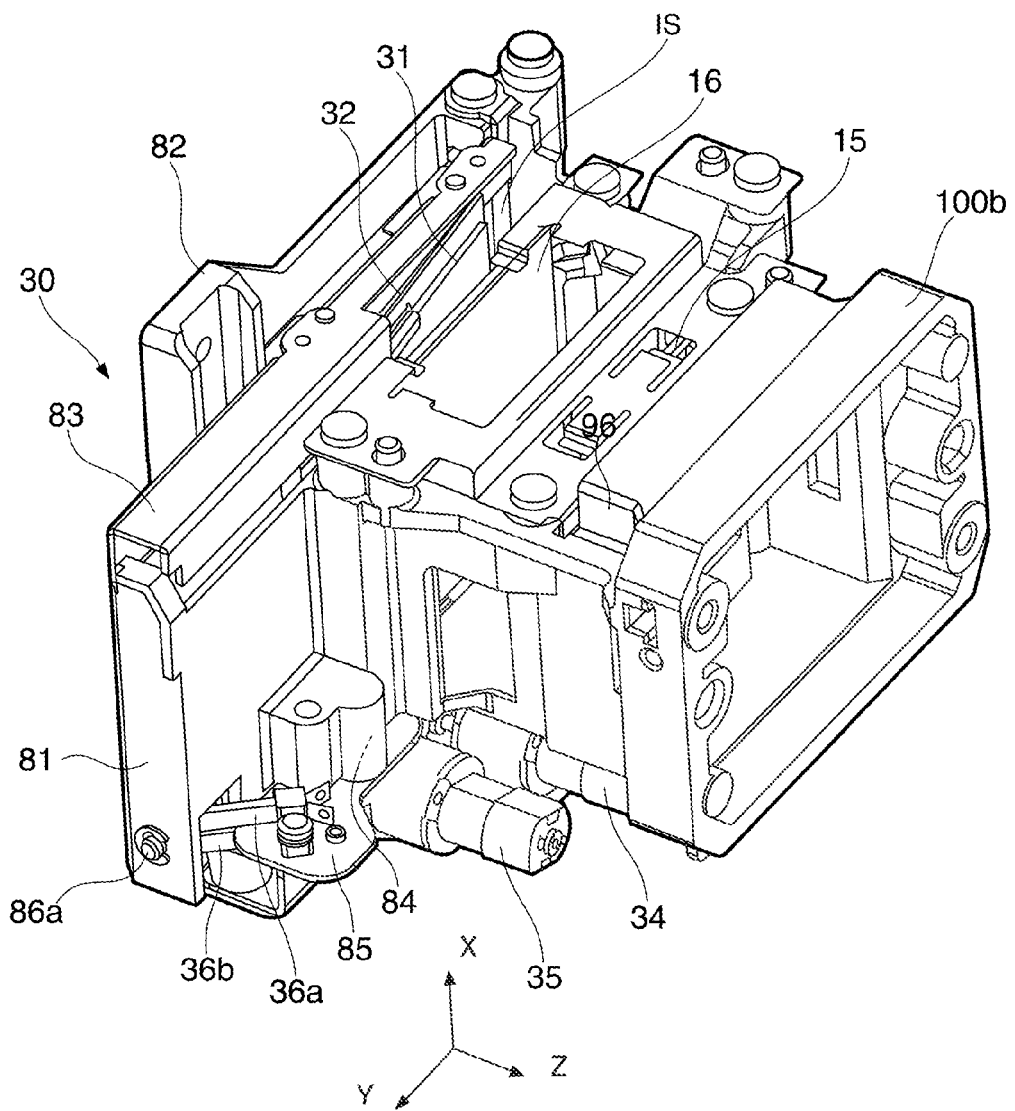
FIG. 4 is a perspective view for explaining a part of the illumination device shown in FIG. 1.

The first light guide part 100b shown in FIG. 4 forms a part to which the first and second lens arrays 15, 16, the polarization conversion section 17, and the mode switching device 30 out of the illumination device 20 shown in FIG. 1 are integrally attached. The first light guide part 100b is fixed to the first base section 95 shown in FIG. 3A via a fixing member 82 disposed on the base side thereof. The first light guide part 100b has a housing section 81 projected toward the +Y side from the main body on the light path, and the housing section 81 houses the cut filter 31 and the aperture 32 constituting the mode switching device 30 inside the thin rectangular internal space IS so as to be able to slide in the Y direction. A lid member 83 is fixed to the upper part (the +X side) of the housing section 81 along the longitudinal direction of the housing section 81 to thereby prevent the bumpy movement of the cut filter 31 and the aperture 32. A support member 85 for supporting the drive mechanism 84 forming a part of the slide mechanism 33 shown in FIG. 1 is fixed to the bottom part (the −X side) of the housing section 81. The electric motors 34, 35 and position sensors 36a, 36b shown in FIG. 1 are also fixed to the support member 85.

Figure 5:
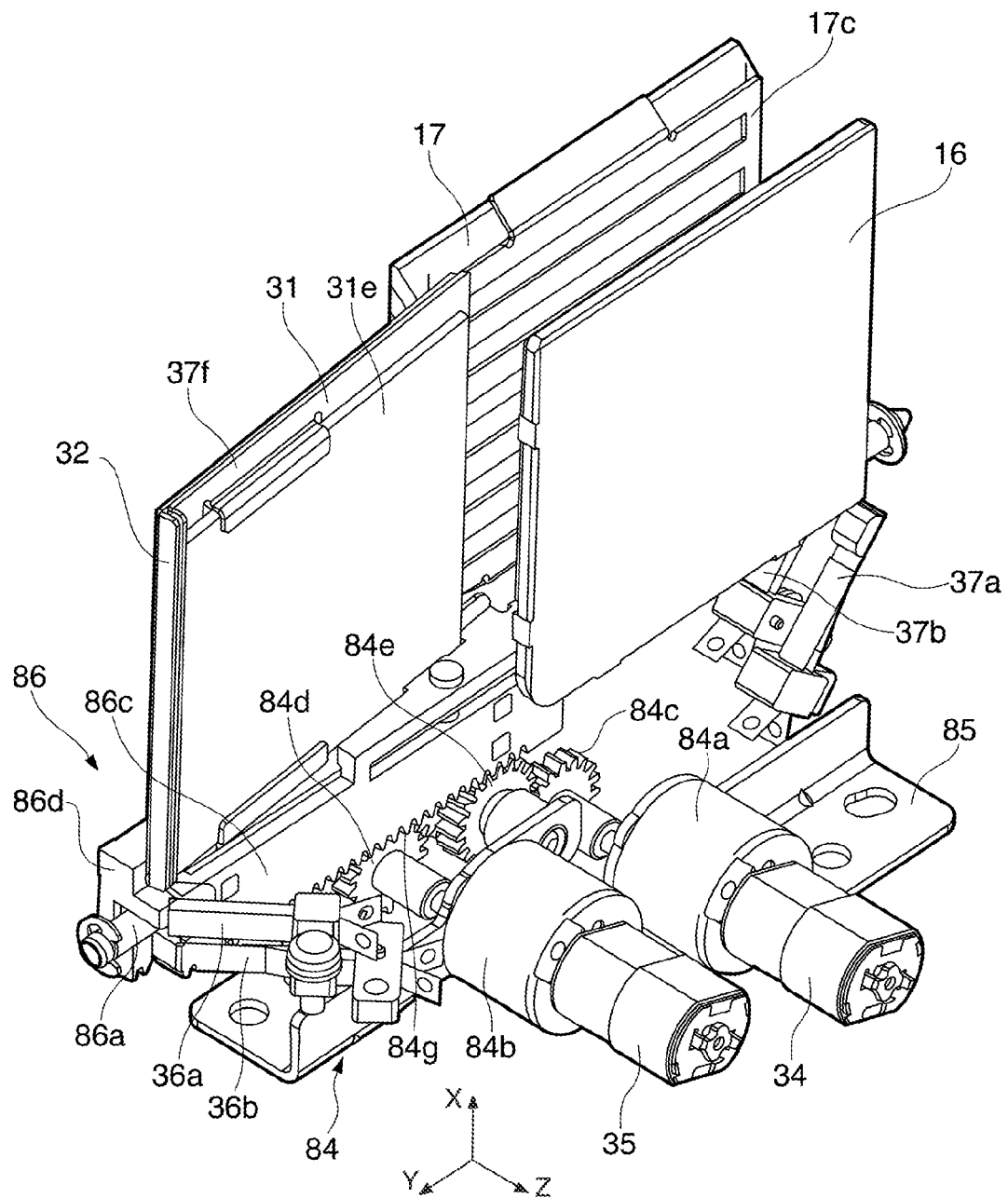
FIG. 5 is a perspective view for explaining a structure such as a drive mechanism, and is a diagram showing a brightness priority mode.
Figure 6:
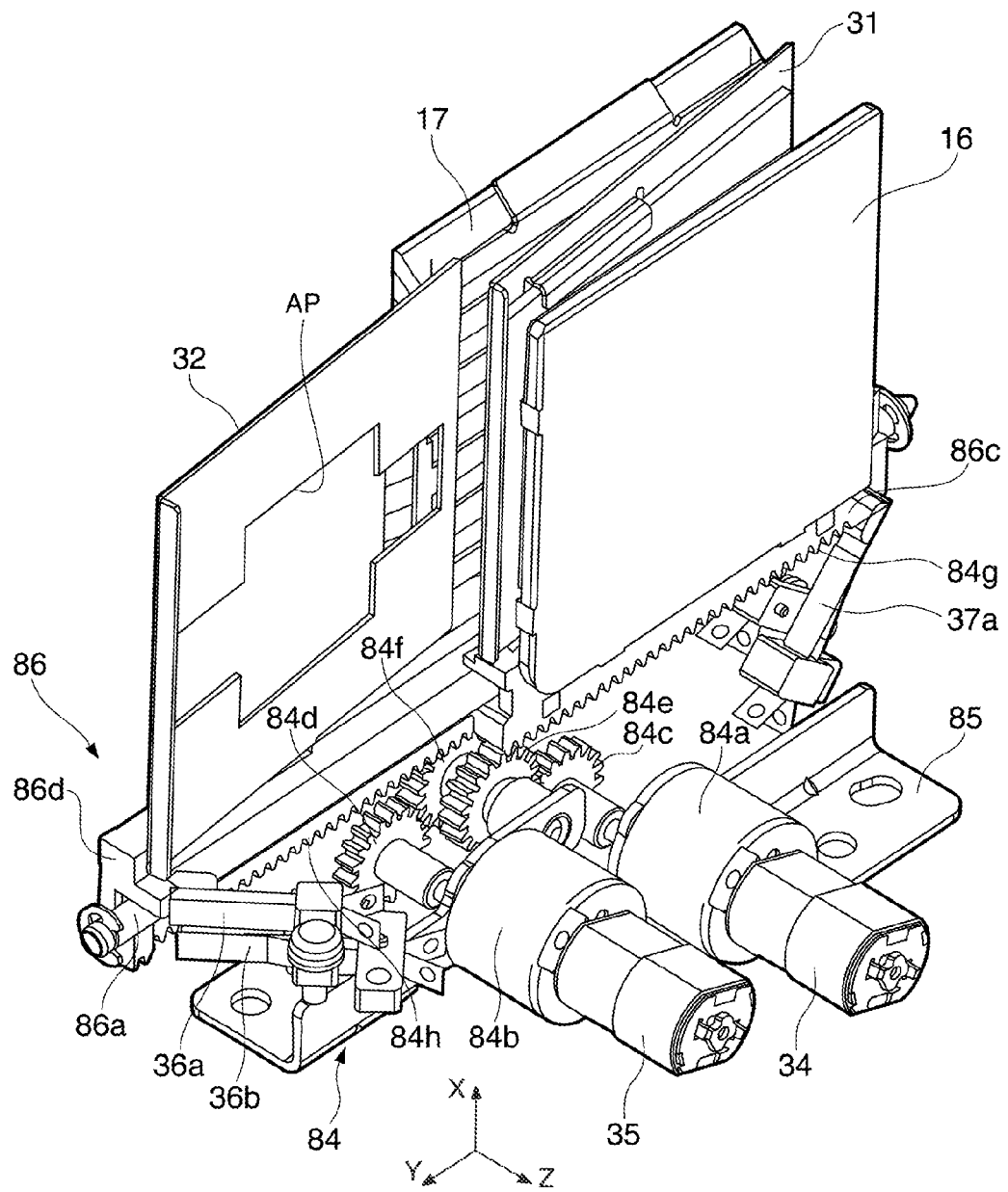
FIG. 6 is a perspective view for explaining the structure such as the drive mechanism, and is a diagram showing a color reproducibility priority mode.
Figure 7:
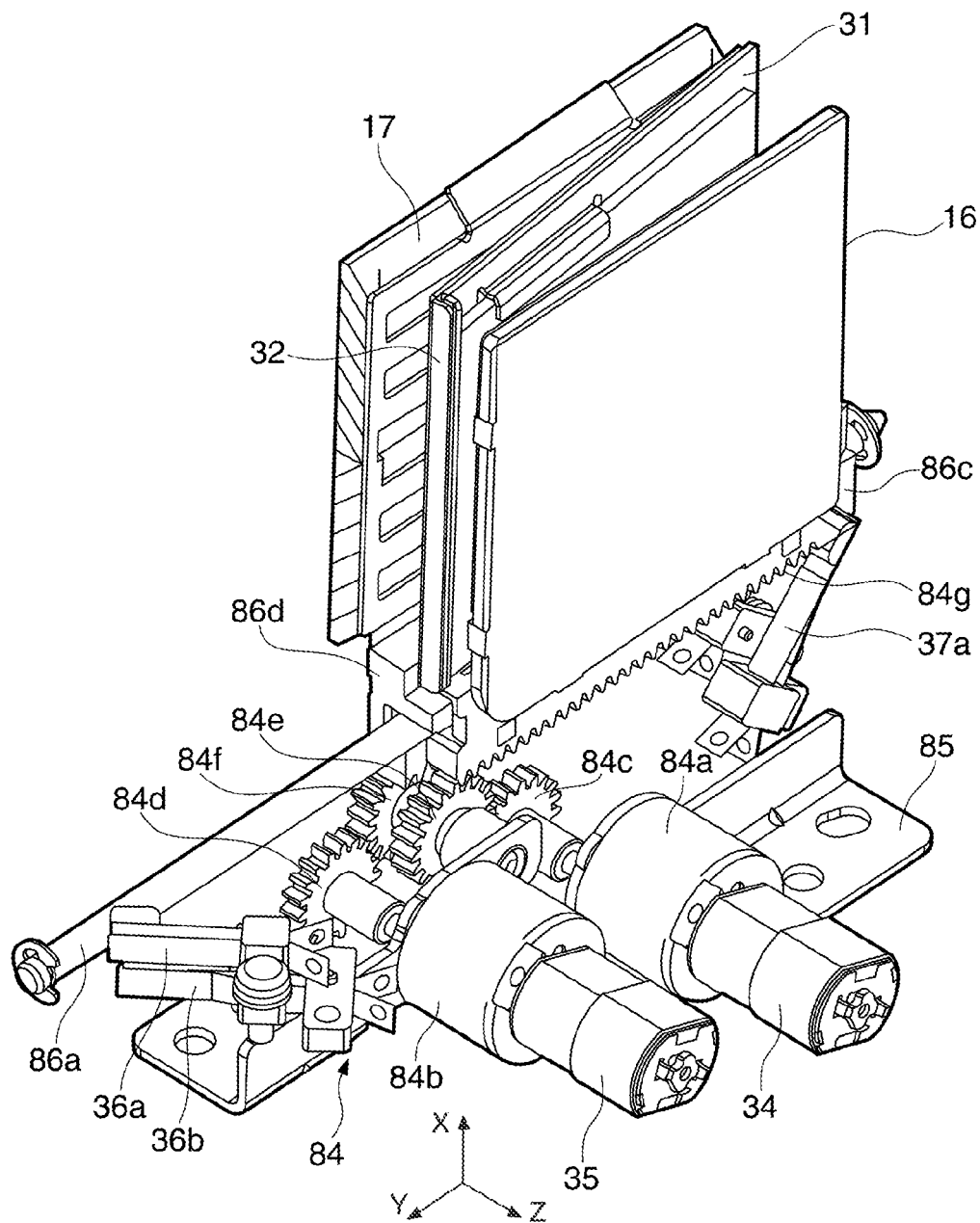
FIG. 7 is a perspective view for explaining the structure such as the drive mechanism, and is a diagram showing the color reproducibility priority mode and at the same time a contrast priority mode.

A specific structure of the drive mechanism 84 and so on for making the cut filter 31 and the aperture 32 move back and forth will be explained with reference to, for example, FIGS. 5, 6, and 7. It should be noted that FIG. 5 corresponds to the brightness priority mode, FIG. 6 corresponds to the color reproducibility priority mode, and FIG. 7 corresponds to the color reproducibility priority mode and the contrast priority mode. The drive mechanism 84 is provided with reduction gearboxes 84a, 84b respectively coupled to the electric motors 34, 35 and fixed to the support member 85, first and second driving gears 84c, 84d individually supported by the support member 85 in a rotatable manner, first and second driven gears 84e, 84f independently supported by the support member 85 in a rotatable manner, a first rack 84g disposed on the cut filter 31 side, and a second rack 84h disposed on the aperture 32 side.

Here, the first and second driving gears 84c, 84d respectively mesh with the first and second driven gears 84e, 84f, and the first and second driven gears 84e, 84f respectively mesh with the first and second racks 84g, 84h. Therefore, the motive energy of the first electric motor 34 is transmitted to the cut filter 31 via the first driving gear 84c, the first driven gear 84e, and the first rack 84g to make the reciprocation of the cut filter 31 in the ±Y directions possible. Further, the motive energy of the second electric motor 35 is transmitted to the aperture 32 via the second driving gear 84d, the second driven gear 84f, and the second rack 84h to make the reciprocation of the aperture 32 in the ±Y directions possible.

Figure 8:
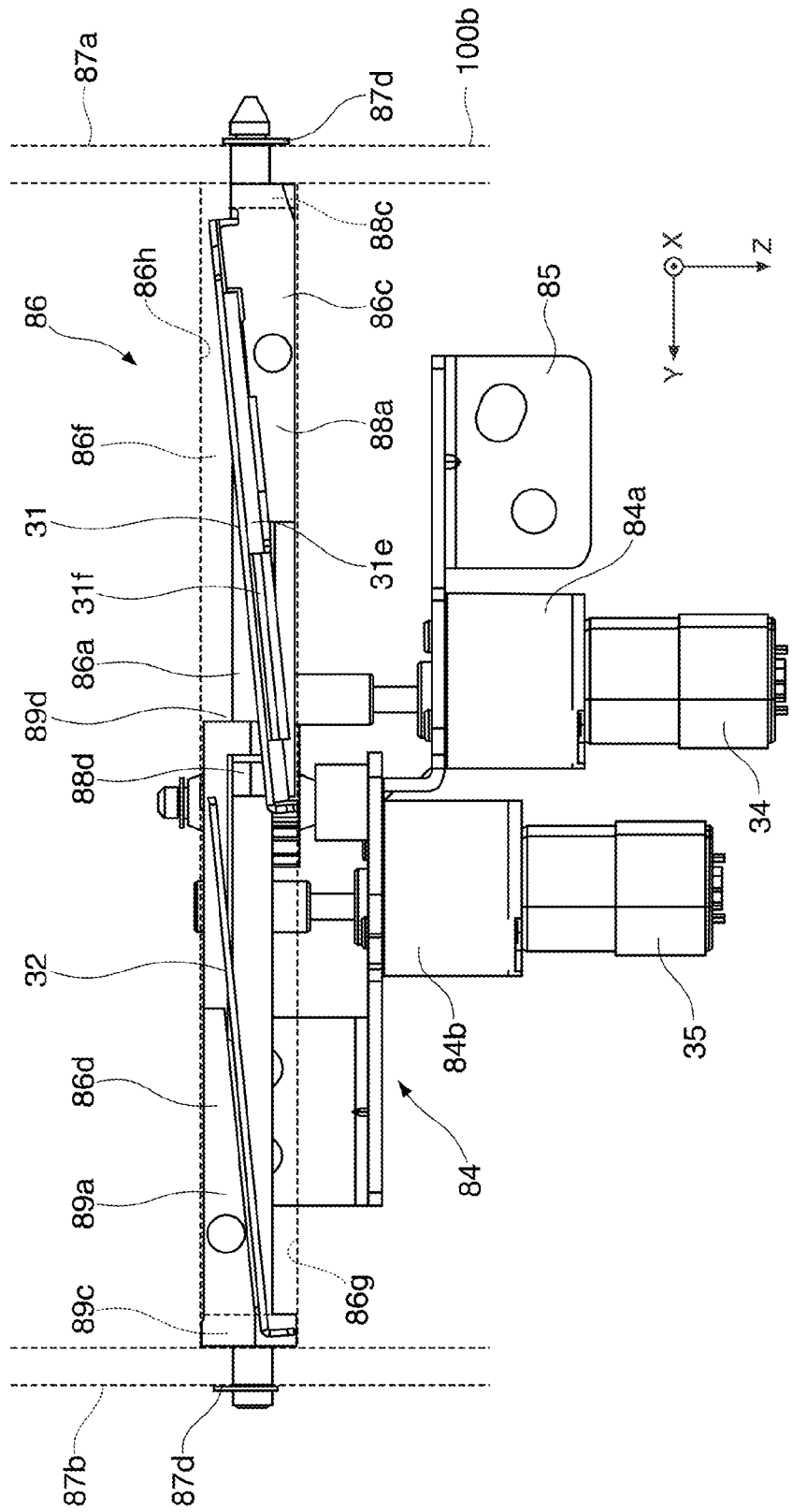

A guide mechanism 86 for supporting the cut filter 31 and the aperture 32 and guiding them along the ±Y directions will be explained with reference to, for example, FIGS. 8, 9A, and 9B. The guide mechanism 86 is for constituting a part of the slide mechanism 33 shown in FIG. 1 and so on similarly to the drive mechanism 84, and is provided with a support shaft 86a, a first slide member 86c as a support member, a second slide member 86d as a support member, and a guide groove 86f as a guide section.

The support shaft 86a is a metal rod having a circular cross-sectional surface, and is bridged between a pair of wall members 87a, 87b of the first guide part 100b and fixed with an E-ring 87d. Thus, the support shaft 86a is supported in the midair state inside the guide groove 86f as the guide section.

The first slide member 86c is an elongated member made of resin supported in a condition of being sandwiched between the support shaft 86a and a first inner wall 86g of the guide groove 86f, and is arranged to be able to reciprocate in the ±Y directions inside the guide groove 86f. On the lower end surface of the first slide member 86c, there is formed the first rack 84g extending in the Y direction as shown in FIG. 9A, and the first slide member 86c is arranged to be able to move to a desired position in the ±Y directions by being driven by the first electric motor 34 via the drive mechanism 84 shown in FIG. 5 and so on. The cut filter 31 is fixed to the upper part 88a of the first slide member 86c, and moves together with the first slide member 86c. The position of the first slide member 86c is monitored by position sensors 36a, 37a (see FIG. 5) having contact with the respective ends of the first slide member 86c at the respective movement limit positions. If, for example, the color reproducibility priority mode is set, it is confirmed that the cut filter 31 is disposed on the light path to thereby be in the ON state by moving the cut filter 31 to the limit position on the −Y side using the position sensor 37a, and by contraries, if the brightness priority mode is set, it is confirmed that the cut filter 31 is in the OFF state in which the cut filter 31 is retracted from the light path by moving the cut filter 31 to the limit position on the +Y side using the position sensor 36a. It should be noted that the cut filter 31 extends roughly along the X-Y plane, and is rotated counterclockwise around an axis parallel to the X-axis as much as the tilt angle α (see FIG. 2A). As shown in, for example, FIG. 5, the cut filter 31 has a main body part 31e functioning as a color gamut filter and a metal frame 31f for supporting the main body part 31e from the periphery thereof, and is fixed to the first slide member 86c via a frame 31f.

The second slide member 86d is an elongated member made of resin supported in a condition of being sandwiched between the support shaft 86a and a second inner wall 86h of the guide groove 86f, and is arranged to be able to reciprocate in the ±Y directions inside the guide groove 86f. On the lower end surface of the second slide member 86d, there is formed the second rack 84h extending in the Y direction as shown in FIG. 9B, and the second slide member 86d is arranged to be able to move to a desired position in the ±Y directions by being driven by the second electric motor 35 via the drive mechanism 84 shown in FIG. 5 and so on. The aperture 32 made of metal is fixed to the upper part 89a of the second slide member 86d, and moves together with the second slide member 86d. The position of the second slide member 86d is monitored by position sensors 36b, 37b (see FIG. 5) having contact with the respective ends of the second slide member 86d at the respective movement limit positions. If, for example, the contrast priority mode is set, it is confirmed that the aperture 32 is in the ON state in which the aperture 32 is disposed on the light path by moving the aperture 32 to the limit position on the −Y side using the position sensor 37b, and by contraries, if the brightness priority mode is set, it is confirmed that the aperture 32 is in the OFF state in which the aperture 32 is retracted from the light path by moving the aperture 32 to the limit position on the +Y side using the position sensor 36b. It should be noted that the aperture 32 is disposed in parallel to the cut filter 31. In other words, the aperture 32 extends roughly along the X-Y plane, and is rotated counterclockwise around an axis parallel to the X-axis as much as the tilt angle α (see FIG. 2A).

As described above, the support shaft 86a functions as the guide section of the first slide member 86c, namely the cut filter 31, in cooperation with the guide groove 86f, and at the same time, functions also as the guide section of the second slide member 86d, namely the aperture 32.

Figure 9A:
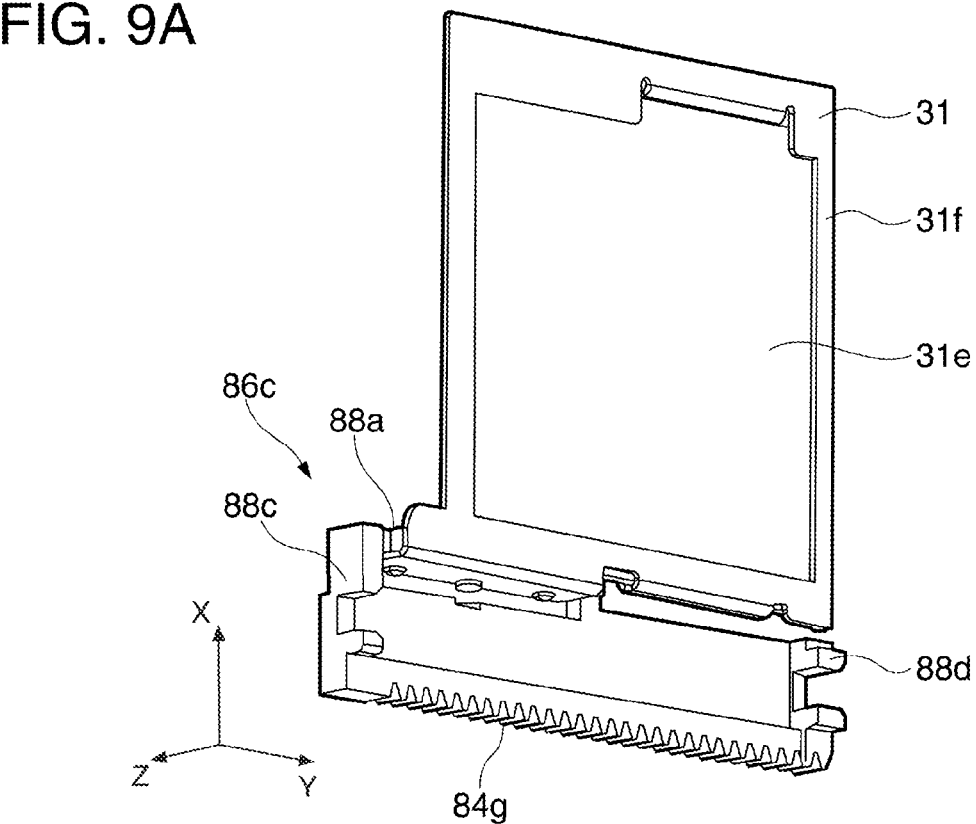
FIG. 9A is a perspective view of a first slide member as a support member for supporting a cut filter.

As shown in FIG. 9A, on the both ends of the first slide member 86c, there are formed a first support section 88c and a second support section 88d. These support sections 88c, 88d each have a bracket-like X-Z cross-sectional shape, and are each supported by the support shaft 86a by surrounding the support shaft 86a from three directions, and as a result, the first slide member 86c is supported by the support shaft 86a at the two places of the both ends in a stable state. It should be noted that since the first slide member 86c has contact with the support shaft 86a only at the support sections 88c, 88d on the both ends, and the other portions are kept in a noncontact state, a smooth movement of the first slide member 86c is assured.

Figure 9B:
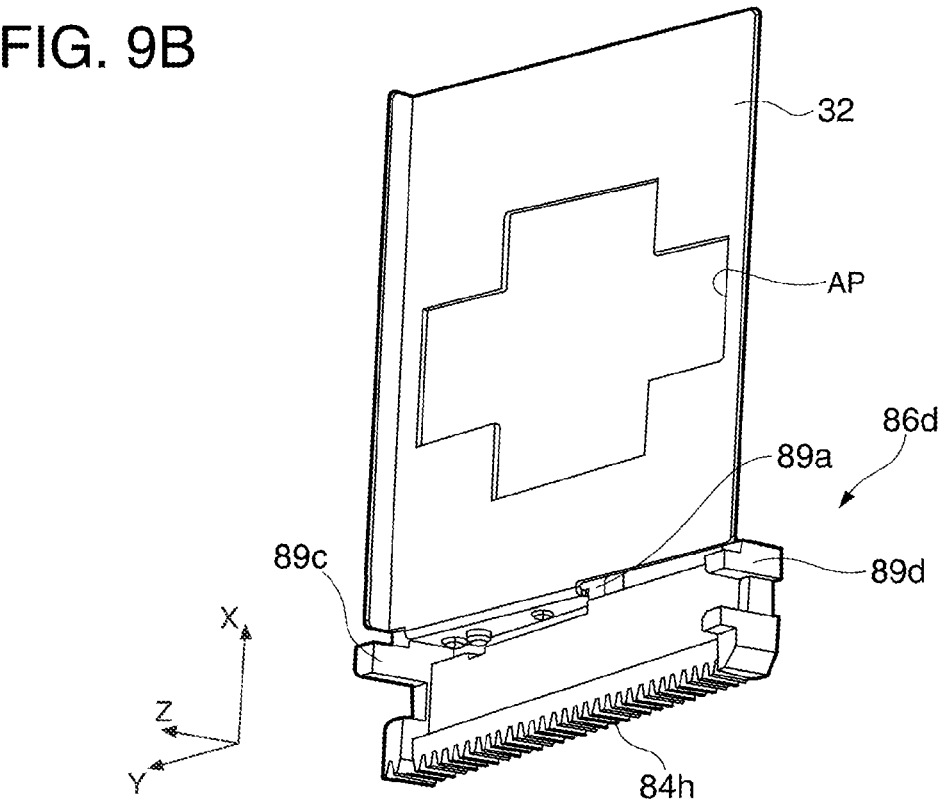
FIG. 9B is a perspective view of a second slide member as a support member for supporting an aperture.

As shown in FIG. 9B, on the both ends of the second slide member 86d, there are formed a first support section 89c and a second support section 89d. These support sections 89c, 89d each have a bracket-like X-Z cross-sectional shape, and are each supported by the support shaft 86a by surrounding the support shaft 86a from three directions, and as a result, the second slide member 86d is supported by the support shaft 86a at the two places of the both ends in a stable state. It should be noted that since the second slide member 86d has contact with the support shaft 86a only at the support sections 89c, 89d on the both ends, and the other portions are kept in a noncontact state, a smooth movement of the second slide member 86d is assured.

It should be noted that the first slide member 86c is disposed so as to be separated from the second slide member 86d, and thus the interference with the second slide member 86d can be avoided. It should be noted that the support sections 88c, 88d on the both ends of the first slide member 86c are respectively disposed on the −Y side of the support sections 89c, 89d on the both ends of the second slide member 86d, and further, the upper part 88a of the first slide member 86c is projected in the −Z direction on the −Y side, and the upper part 89a of the second slide member 86d is projected in the +Z direction on the +Y side. As a result, the first slide member 86c is arranged not to be able to move to the +Y side of the second slide member 86d, and the second slide member 86d is arranged not to be able to move to the −Y side of the first slide member 86c. In other words, although it is possible to dispose the cut filter 31 supported by the first slide member 86c and the aperture 32 supported by the second slide member 86d on the light path so as to overlap each other, and to dispose the cut filter 31 alone on the light path, it is not achievable to dispose the aperture 32 alone on the light path.

The operation of the mode switching device 30 will be explained. Firstly, when the first electric motor 34 is operated under the control of the motor drive section 91, the motive energy is transmitted to the first slide member 86c via the drive mechanism 84, and thus the first slide member 86c moves in the guide groove 86f. On this occasion, by monitoring the rotational direction of the first electric motor 34 and the detection values of the respective position sensors 36a, 37a, the first slide member 86c, namely the cut filter 31, can be disposed so as to be switched between the ON state of being disposed on the light path and the OFF state of being retracted from the light path at a desired timing. Further, when the second electric motor 35 is operated under the control of the motor drive section 91, the motive energy is transmitted to the second slide member 86d via the drive mechanism 84, and thus the second slide member 86d moves in the guide groove 86f. On this occasion, by monitoring the rotational direction of the second electric motor 35 and the detection values of the respective position sensors 36b, 37b, the second slide member 86d, namely the aperture 32, can be disposed so as to be switched between the ON state of being disposed on the light path and the OFF state of being retracted from the light path at a desired timing. It should be noted that if the first slide member 86c, namely the cut filter 31, is in the OFF state at the limit position on the +Y side, the second slide member 86d, namely the aperture 32, has no choice but to be in the OFF state at the limit position on the +Y side, and has no chance to be in the ON state on the −Y side. Such a limitation is achieved mechanically as described above, but can also be realized electrically using the position sensors 36a, 36b, 37a, and 37b under the control of the motor drive section 91.

As described above, according to the projector 100 of the present embodiment, since the aperture 32 blocks at least a part of the illumination light to thereby transmit by priority the illumination light relatively contributing to the substantial improvement of the contrast characteristics in the illumination device 20, it is possible to make the illumination device 20 operate in the contrast priority mode for performing image projection giving priority to the contrast. Further, since the aperture 32 is disposed with a tilt with respect to the plane perpendicular to the center axis of the illumination light, the negative effect such as generation of a ghost image can be prevented in the image projection in the contrast priority mode. Further, by disposing the aperture between the posterior stage and the overlapping lens, appropriate selection between the light having contribution to the substantial improvement of the contrast characteristics and the light having no contribution thereto out of the illumination light becomes possible. Further, since the cut filter 31 and the aperture 32 as the two optical components can individually be disposed on the light path in the illumination device 20, it is possible to adjust the projection state of the image by the projector 100 in a plurality of patterns such as the color reproducibility priority mode, the contrast priority mode, the brightness priority mode. Further, by disposing the aperture on the side of the polarization conversion section to thereby prevent the aperture from becoming high temperature, it is possible to prevent the members for holding the aperture and the members in the vicinity of the aperture from being deteriorated and damaged by the heat. Further, according to the projector 100 of the present embodiment, since the cut filter 31 and the aperture 32 are arranged to be able to be disposed on the light path so as to overlap each other by the sliding movement using the common support shaft 86a provided to the guide mechanism 86, the slide mechanism 33 as the mechanism for moving the cut filter 31 and the aperture 32 can be downsized with the common support shaft 86a, and thus, the cut filter 31 and the aperture 32 can be moved into and out of the light path with a reduced space. Thus, the light intensity loss in the illumination device 20 can be reduced even in the case in which the cut filter 31 and the aperture 32 as two optical components are arranged to be able to move into and out of the light path to thereby make a variety of switching of the projection state possible.

MODIFIED EXAMPLES, ETC

Although the invention is hereinabove explained along the embodiment, the invention is not limited to the embodiment described above, but can be put into practice in various forms within the scope or the spirit of the invention, and the following modifications, for example, are also possible.

Although in the embodiment described above the rod having a circular cross-sectional shape is used as the support shaft 86a for constituting the guide mechanism 86, rods with a variety of cross-sectional shapes such as a rectangle can also be used. Further, the support shaft 86a is not limited to the case of single use, but can be a plurality of support shafts and is disposed between the first slide member 86c and the second slide member 86d. Further, the support shaft 86a is not required to be disposed on the lower side in the periphery of the light path shown in, for example, FIG. 5, but can be disposed on either of the upper, right, and left sides of the light path. In other words, the sliding direction of the both slide members 86c, 86d can arbitrarily be changed in accordance with the specifications of the projector 100 and so on.

Although in the embodiment described above the racks 84g, 84h are provided respectively to the slide members 86c, 86d disposed on the both sides of the support shaft 86a, it is also possible to dispose the racks on the opposite side (specifically, the sides on the +X side and the periphery thereof) to the slide members 86c, 86d across the cut filter 31 and the aperture 32 to thereby drive the cut filter 31 and the aperture 32.

Figure 10:
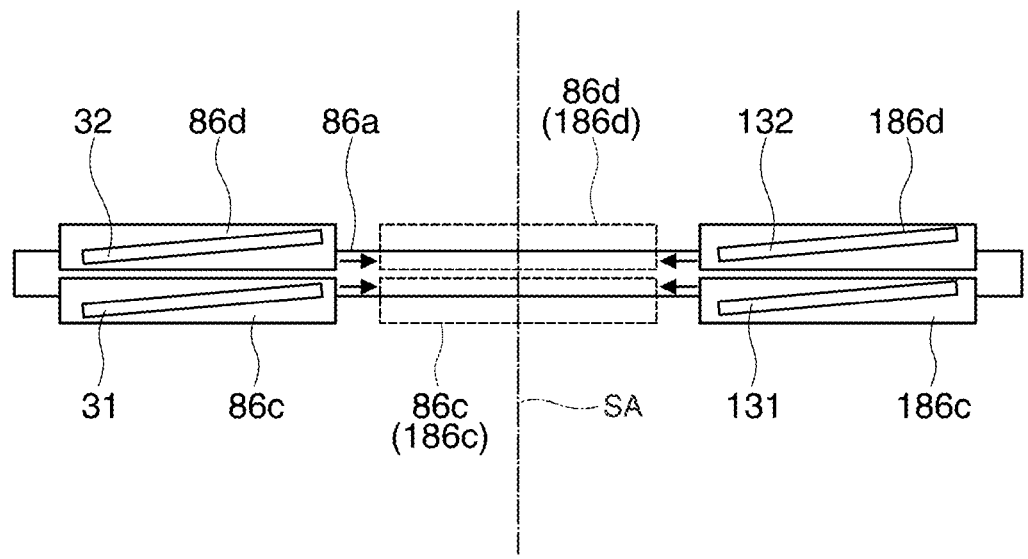
FIG. 10 is a conceptual diagram for explaining a modified example of the guide mechanism.

Further, it is also possible to extend the support shaft 86a evenly toward the both sides of the system optical axis SA. In this case, since the retraction direction of the cut filter 31 and the retraction direction of the aperture 32 can be set to opposite to each other, it becomes possible with ease to dispose the aperture 32 alone on the light path. Further, as shown in FIG. 10, in the case of evenly extending the support shaft 86a toward the both sides of the system optical axis SA, the slide members 86c, 186c for respectively supporting the optical components 31, 131 can be disposed slidably on the upstream side of the support shaft 86a in the light path, and the slide members 86d, 186d for respectively supporting the optical components 32, 132 can be disposed slidably on the downstream side of the support shaft 86a in the light path. In this case, the four optical components 31, 131, 32, and 132 can arbitrarily be combined and disposed on the light path with a reduced space.

Although in the embodiment described above the slide members 86c, 86d are disposed on one side of the cut filter 31 and the aperture 32, by using the two sets of slide members, it is also possible to hold the cut filter 31 and the aperture 32 in two sides opposed to each other such as upper and lower sides.

Although in the embodiment described above the cut filter 31 and the aperture 32 are disposed with a tilt with respect to the system optical axis SA, it is also possible to dispose the cut filter 31 and the aperture 32 so as to be perpendicular to the system optical axis SA.

The shape of the opening AP of the aperture 32 explained above is nothing more than an exemplification, and the desired contrast can be realized with the aperture 32 having an opening AP with a variety of shapes.

Although in the embodiment described above it is not explained that the light intensity of the illumination light IL emitted from the illumination device 20 is controlled in multiple levels, by disposing, for example, an openable/closable block member between the first and second lens arrays 15, 16, continuous adjustment of the illumination light intensity becomes possible, and the dynamic contrast can be enhanced in, for example, the projection of a moving image.

Further, the drive mechanism 84 can be eliminated, and it is also possible to manually operate the first slide member 86c and the second slide member 86d.

Although in the embodiment described above there is explained the example of the case in which the invention is applied to the projector provided with the reflective liquid crystal light valves 60g, 60r, and 60b, the invention can also be applied to projectors provided with transmissive liquid crystal light valves. It should be noted here that "transmissive" denotes that the liquid crystal light valve is a type of transmitting the light, and "reflective" denotes that the liquid crystal light valve is a type of reflecting the light. Further, it is also possible to use light modulation device composed of digital micromirror device having micromirrors arranged two-dimensionally, and so on instead of the liquid crystal light valves 60g, 60r, and 60b.

Although in the embodiment it is assumed that the light source device 10 is provided with a light emitting tube 11, it is possible to use other light sources such as LEDs instead of the light emitting tube 11.

Although in the embodiment described above, only the example of the projector 100 using the three liquid crystal light valves 60g, 60r, and 60b is cited, the invention can be applied to a projector using two liquid crystal light valves or a projector using four or more liquid crystal light valves. Further, the light path configuration of the color separation light guide section 40 for guiding the illumination light IL to the liquid crystal light valves 60g, 60r, and 60b is not limited to the configuration of the illustrative example, but a variety of configurations such as replacement of the cross dichroic mirror 41 with a typical dichroic mirror, or elimination of the light path folding mirror 19 can be adopted.

Further, as the projector, a front projector performing image projection from a direction of observing the projection screen and a rear projector performing image projection from the opposite direction of observing the projection screen can be cited, and the configuration of the projector shown in FIG. 1 and so on can be applied to either of the types of the projectors.

The present application claim priority from Japanese Patent Application No. 2010-141393 filed on Jun. 22, 2010, and No. 2010-266227 filed on Nov. 30, 2010, which is hereby incorporated by reference in its entirety.

What is claimed is:

1. A projector comprising:
a light source device which emits an illumination light;
an aperture disposed with a tilt with respect to a plane perpendicular to a center axis of the illumination light, provided with an opening section which transmits a part of the illumination light, and which blocks a rest of the illumination light;
a cut filter which attenuates a light in a predetermined wavelength range;
a first lens array and a second lens array which divide the illumination light from the light source device into a plurality of partial lights; and
an overlapping lens which overlaps the illumination light transmitted through the first lens array and the second lens array,
wherein the aperture and the cut filter are configured to be disposed individually or together in the light path between the light source device and the overlapping lens.

2. The projector according to claim 1, further comprising:
a polarization conversion section disposed between the second lens array and the overlapping lens which arranges a polarization state,
wherein two optical components, the cut filter and the aperture, are disposed between the second lens array and the polarization conversion section, and
the cut filter is disposed on a second lens array side, and the aperture is disposed on a polarization conversion section side.

3. The projector according to claim 2, further comprising:
a support shaft common to the two optical components which supports the two optical components slidably in a predetermined direction intersecting an optical axis,
wherein the two optical components are arranged to be able to be disposed on the light path so as to overlap each other by a slide movement.

4. The projector according to claim 3, wherein
the light source device, the first lens array and the second lens array, the polarization conversion section, and the overlapping lens constitute an illumination device, and
the illumination device has a guide section which supports the two optical components from respective sides of the support shaft opposite to each other.

5. The projector according to claim 2, wherein
the two optical components are disposed with a tilt with respect to a reference plane perpendicular to an optical axis.

6. The projector according to claim 5, wherein
the two optical components move in a direction with a tilt with respect to the reference plane to thereby move into and out of the light path.

7. The projector according to claim 5, wherein
the two optical components move into and out of the light path while keeping a state having a tilt with respect to the reference plane.

8. The projector according to claim 2, wherein
the aperture can be disposed on the light path under the condition that the cut filter is disposed on the light path.

9. The projector according to claim 3, wherein
the two optical components each have a support member which supports a component main body, wherein
the support member has a rack disposed so as to face the support shaft in a condition of being supported by the support shaft, and
the rack is driven by an electric motor via a gear.

10. The projector according to claim 1, wherein
the aperture and the cut filter are configured to be moved into and out of the light path independent of each other.

\* \* \* \* \*